(No Model.)

O. RUST.
WELL DRILLING MACHINE.

No. 257,766. Patented May 9, 1882.

WITNESSES:
Fred. G. Dieterich
Solon C. Kemon

INVENTOR.
Oscar Rust
By
ATTORNEYS.

N. PETERS. Photo-Lithographer, Washington, D. C.

UNITED STATES PATENT OFFICE.

OSCAR RUST, OF ST. JOSEPH, MISSOURI.

WELL-DRILLING MACHINE.

SPECIFICATION forming part of Letters Patent No. 257,766, dated May 9, 1882.

Application filed February 9, 1882. (No model.)

*To all whom it may concern:*

Be it known that I, OSCAR RUST, of St. Joseph, in the county of Buchanan and State of Missouri, have invented a new and useful Improvement in Well-Drilling Machines, of which the following is a full, clear, and exact description, reference being had to the annexed drawings, forming part of this specification.

This invention relates to an improvement in the means for operating the slush or sand bucket in a well-drilling machine, whereby suitable power and means shall be provided for sinking a heavy bucket through quicksand and hoisting it rapidly to the surface, as hereinafter described.

Figure 2:
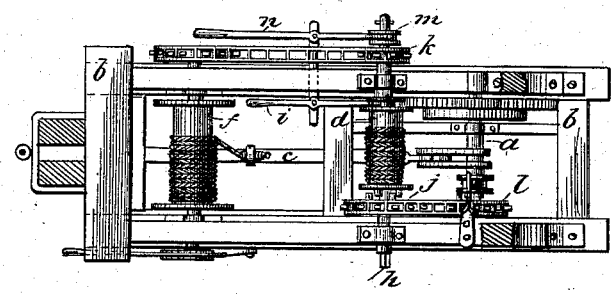
Figure 3:
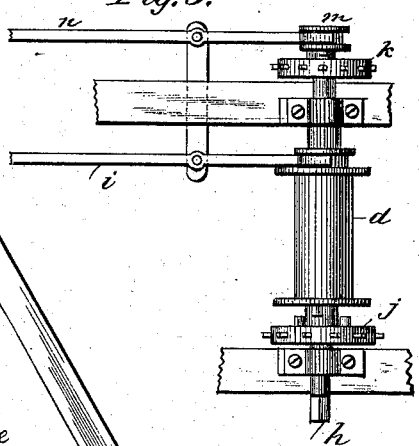
Figure 1:
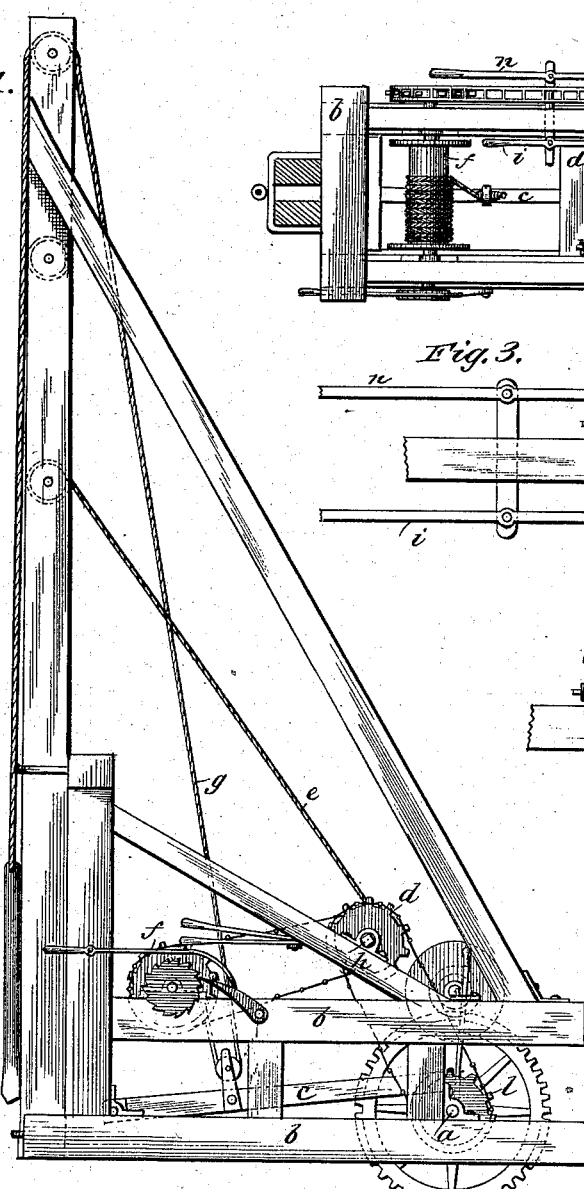

In the accompanying drawings, Figure 1 is a side elevation of a well-drilling machine embodying my improvement. Fig. 2 is a plan view of the same, and Fig. 3 is a plan of the mechanism for operating the sand-bucket.

With a view to securing as great a degree of strength and compactness of structure in a well-drilling machine as is consistent with cheapness and simplicity of operation, I locate the driving-shaft $a$ at the base of the frame $b$, on a level with the fulcrum of the drill-operating lever $c$, and provide a trench in the ground immediately below the lever and the driving-wheel to accommodate these parts. By thus applying the power at the base of the frame instead of at the top, as is usually done, the machine is less liable to be rocked and strained by the motion of the driving-shaft, and more room is provided for the compact arrangement of the rope-winding drums and their operating mechanism. The drum $d$, carrying the rope $e$ of the slush-bucket, may thus be located at a point nearly above the driving-wheel, and geared therewith by means of sprockets and a chain-belt, while the drum $f$, carrying the drill-rope $g$, is placed near the opposite end of the frame and geared with the drum $d$. In this manner only three shafts are necessary in the machine. The drum $d$ is placed loosely upon the shaft $h$, and is provided with a shifting-lever, $i$, by which a projection on the drum is made to engage with a clutch on the sprocket $j$, which is rigidly secured to the said shaft. The shaft $h$ is also provided with a loose sprocket, $k$, which is belted to a sprocket on the drum $f$, and which is adapted to rotate with the shaft $h$ by means of a clutch-collar, $m$, sliding upon a feather on the said shaft, and a lever, $n$, for operating the said clutch. The shaft $h$ is thus adapted to transmit power from the driving-shaft to the drum $f$, which carries the drill-rope.

It will be seen that the shaft $h$ and its sprocket $j$ may be in constant rotation, while the drum $d$ may be stationary. When it is desired to apply power to the drum $d$ to wind the rope of the slush-bucket, the drum may be shifted into and out of engagement with the clutch on the rotating sprocket by the operation of its lever. The rotation of the drum $d$ may thus be accomplished without transmitting the power to the drum $f$. In like manner the sliding clutch $m$, rotating with the shaft $h$, may be shifted into and out of engagement with the loose sprocket $k$, and motion thus transmitted to the drum $f$. The two drums may thus be operated simultaneously or independently of each other without stopping the driving mechanism at any time.

The construction of the drum $d$ and its connections, as above described, is particularly adapted for operating a heavy or deep slush-bucket in cases where it is often necessary to sink the bucket into a bed of quicksand. The full power of the machine can thus be applied to lift and drop the bucket to cause it to penetrate the sand. The longer the bucket is made the more it will contain, and consequently the power necessary for hoisting the bucket should be increased correspondingly.

It is to be understood that the sprocket $l$ on the driving-shaft is loosely arranged thereon, and is not in motion while the drilling is in operation. By means of a clutch and lever, as shown, the said sprocket is to be made to rotate with the driving-shaft when the power is to be transmitted to the drums.

Having thus described my invention, what I claim, and desire to secure by Letters Patent, is—

1. In a well-drilling machine, the combination, with the driving-shaft $a$, located at the center of the sweep of lever $c$, of the drum $d$, carrying the rope of the slush-bucket and geared at will directly with the driving-shaft, whereby the greatest power of the machine shall be applied to lift and sink a heavy bucket through a bed of sand, as specified.

2. In a well-drilling machine, the shaft $h$, having the sprocket $j$, which is provided with a clutch rigidly secured thereto at one end, the drum $d$, loosely mounted on the shaft and adapted to be shifted into engagement with said clutch, the collar $m$, sliding on the shaft at its other end, and the sprocket $k$, loosely mounted on said shaft and adapted to be engaged by the said collar, whereby two shafts, in addition to the driving-shaft, shall suffice for operating the two drums independently of each other, as specified.

OSCAR RUST.

Witnesses:
A. G. LYNE,
SOLON C. KEMON.